Dec. 20, 1938.  C. L. EKSERGIAN  2,141,127
SYMMETRICAL SHOE BRAKE
Filed June 30, 1934  3 Sheets-Sheet 1
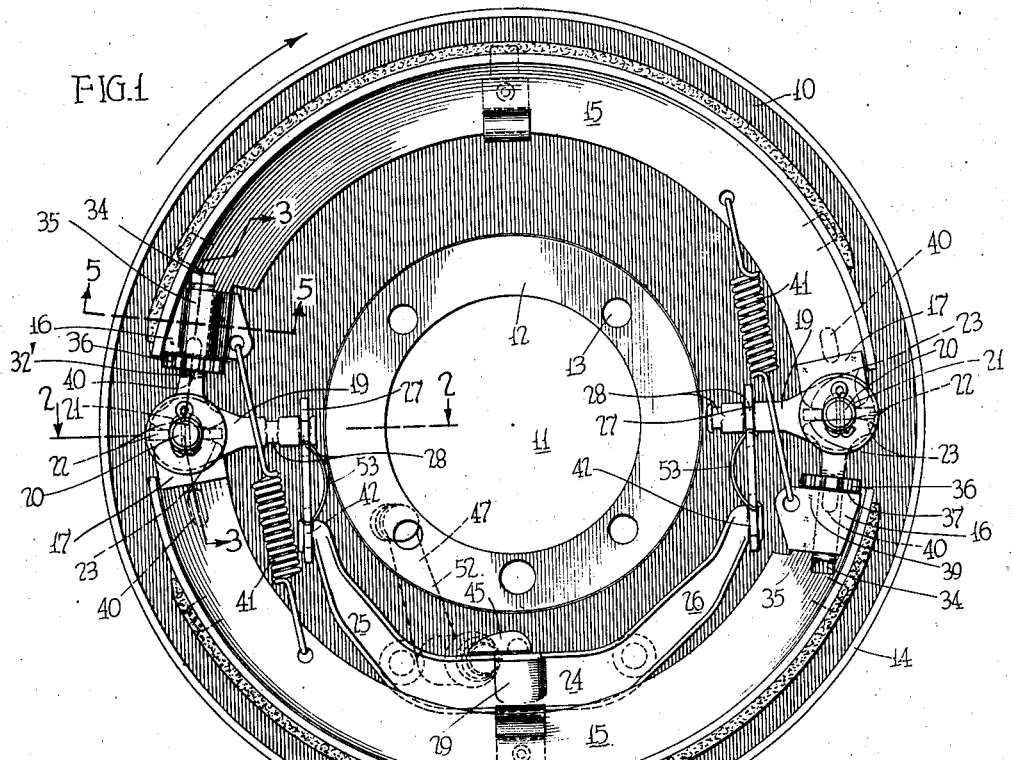
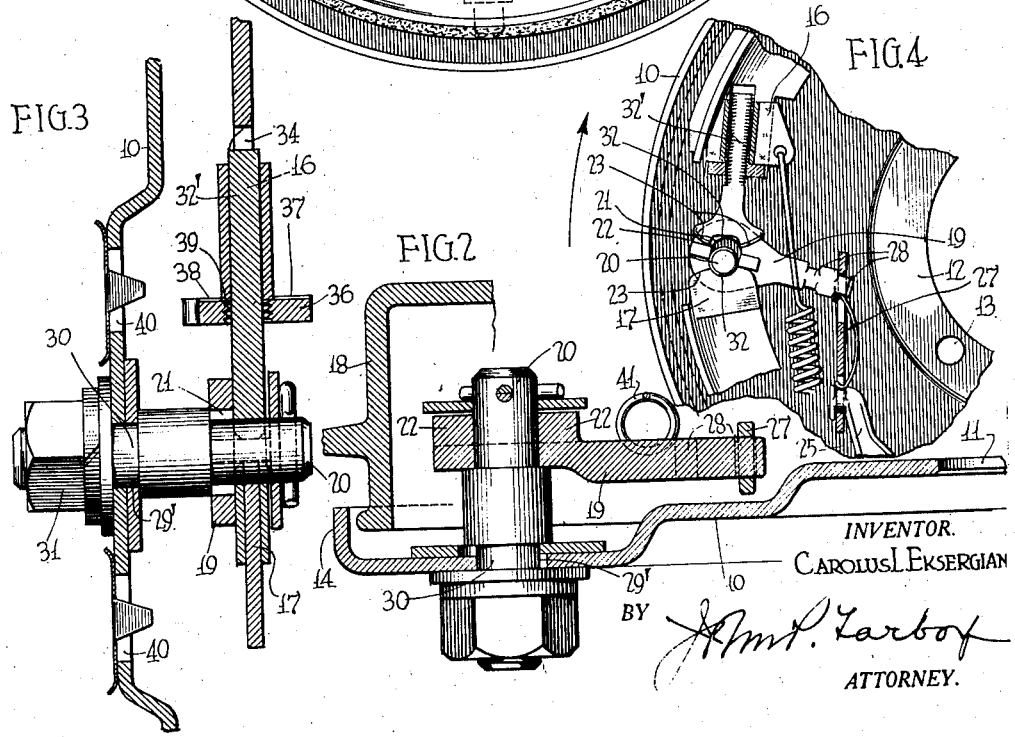
INVENTOR.
CAROLUS L. EKSERGIAN
BY
ATTORNEY.

Dec. 20, 1938.   C. L. EKSERGIAN   2,141,127
SYMMETRICAL SHOE BRAKE
Filed June 30, 1934   3 Sheets-Sheet 2

INVENTOR.
Carolus L. Eksergian.
BY
John P. Tarbox
ATTORNEY.

Dec. 20, 1938.    C. L. EKSERGIAN    2,141,127
SYMMETRICAL SHOE BRAKE
Filed June 30, 1934    3 Sheets—Sheet 3

INVENTOR.
CAROLUS L. EKSERGIAN.
BY John P. Tarbox
ATTORNEY.

Patented Dec. 20, 1938

2,141,127

UNITED STATES PATENT OFFICE 2,141,127

SYMMETRICAL SHOE BRAKE

Carolus L. Eksergian, Detroit, Mich., assignor to Budd Wheel Company, Philadelphia, Pa., a corporation of Pennsylvania Application June 30, 1934, Serial No. 733,217

6 Claims. (Cl. 188—78)

My invention relates to brakes particularly for automobiles and other automotive vehicles and is characterized by features which have application to other types of brakes.

Yet further, my invention has more particularly to do with internal brakes of the multiple shoe type, especially the two shoe type. More particularly, it has to do with the two shoe type of brake which perhaps is most significantly termed a symmetrical two shoe brake in that one of its principal aims is the development of a two shoe brake which will be powerful and efficient in each direction of movement of the part which is braked or shall we say, in each the forward and the reverse movements of the vehicle.

Brakes of this general object have been heretofore proposed. My aim is to produce such a brake of more perfect symmetry of application of power and greater power and efficiency than any heretofore produced. Co-relatively I aim to produce such a brake which has the fewest possible number of parts, has a low tooling cost, a low cost of production in quantity, and is of the lightest possible weight consistent with strength, reliability, durability and ruggedness.

These aims and others I attain in large part through the utilization between the adjacent ends of the brake shoes of load applying means developing respectively different loads under identical applied power together with power applying means so adjusting the power application as to equalize the developed loads. I further realize these ends by employing floating load applying means between adjacent shoe ends of the pairs by providing fixed anchors also between the adjacent ends of the pairs coacting alternatively with the respective shoe ends of the pairs. Similarly centering means for the brake in its idle condition are provided between the adjacent shoe ends and the shoe ends arranged to coact therewith in varying degrees of centering action according to the direction of operation of the brake, each shoe end of a pair differently from the other shoe end of a pair. Radial adjustments of the centering means afford heel adjustment to the brake shoe while tangential adjustments of certain of the shoe ends afford toe adjustment of the brake.

In the specific embodiment shown in the accompanying drawings I delineate a mechanically operated brake in which the load applying means consists of cam levers floated upon anchor pins located between shoe ends of the pairs. The cams of these levers coact with the shoe ends of the pairs, variably developing the load for equal application of the power. The levers, however, are of differential length and are linked to a common yoke to which power is applied at an intermediate point, relative lengths of the cam levers and of the opposite arms of the yoke being such that different forces are applied to the different cam levers and the loads developed are equalized.

For a full appreciation of the advantages of my invention and an understanding of their realization, reference is to be had to these drawings of which —

Figure 1 is a side elevation of an automobile brake mechanism the two shoes of which are delineated as mounted upon a fixed supporting plate usually carried by the fixed axle of the vehicle, the brake drum per se usually connected with the wheel not being shown.

Figure 2 is a section on line 2—2 of Fig. 1 looking in the direction of the arrows and showing the parts of this section of Fig. 1 in their proper relation to a brake drum such as is usually connected with the wheel of a vehicle.

Figure 3 is a section on line 3—3 of Fig. 1 looking in the direction of the arrows showing the brake anchoring and adjusting means.

Figure 4 is an elevation of that portion of the mechanism shown in Fig. 1 showing the cam lever load applying means in load applying position, certain parts being removed.

Figs. 6 and 7 depict the connection especially utilizable in connection with rear axle brakes.

Figure 9:
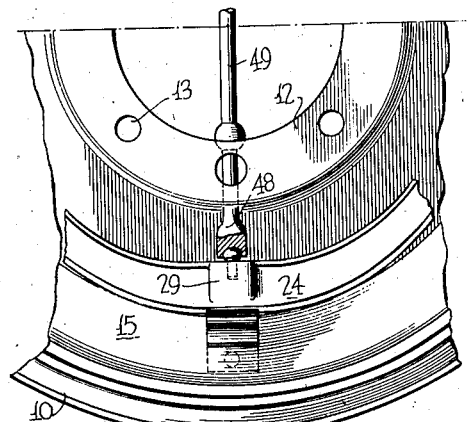
Figure 9 is a side elevation of the same connection with certain parts omitted.
Figure 5:
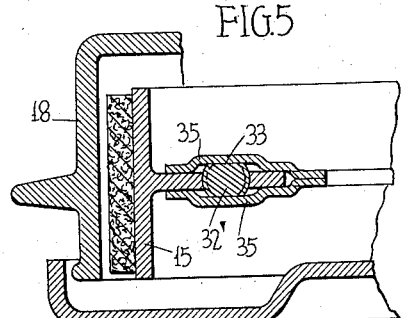
Figure 5 is a section on line 5—5 of Fig. 1 showing the connection of the brake adjusting device to the brake shoe 10.
Figure 6:
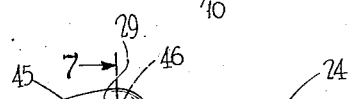
Figure 6 is a plan view in partial section showing the brake applying connection to the power applying yoke of Fig. 1.
Figure 8:
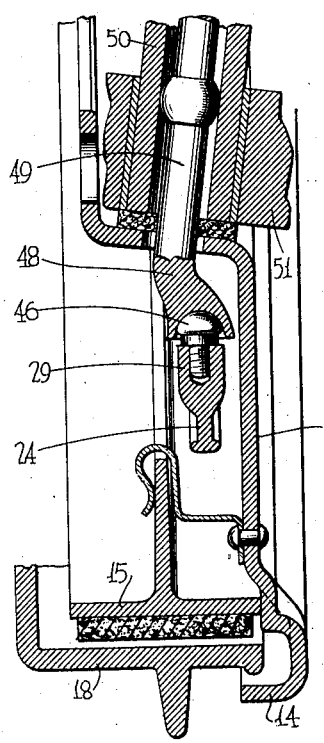
Figure 8 is a vertical transverse cross section of a brake applying connection to the yoke suitable especially for front axle brakes.
Figure 7:
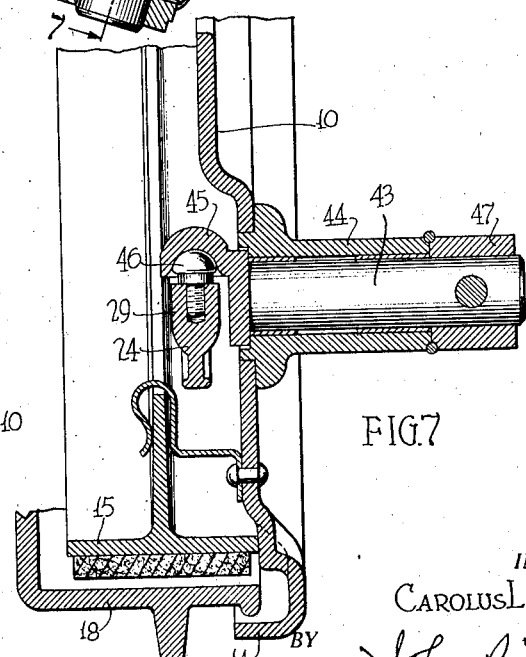
Figure 7 is a vertical section of this connection and adjacent parts approximately on line 7—7 of Fig. 6.
Figure 10:
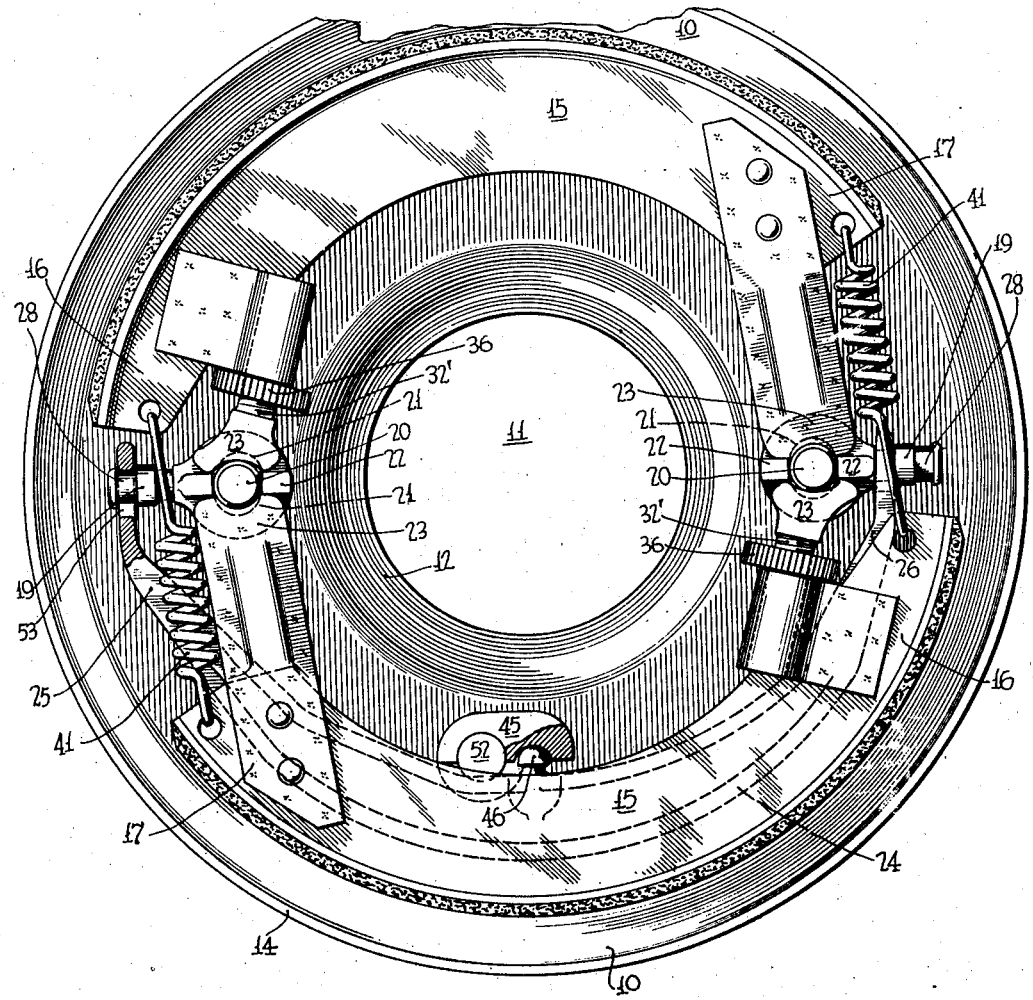
Figure 10 is a variation in side elevation with parts removed.

Fig. 10 differs from the construction in Figs. 1 to 9 outstandingly in having the cam levers directed radially outwardly instead of radially inwardly of the structure.

Throughout the several drawings similar reference characters are used to designate similar parts.

Referring first to Figs. 1 to 7 and particularly Fig. 1, the fixed supporting plate for the brake shoes is designated 10. It is shown as provided with a central aperture 11 to fit over the axle end and with an inner periphery 12 provided with bolt holes 13 for mounting. Its periphery is provided with the usual strengthening and dust guard flange 14. The brake shoes are designated 15 and their opposite ends 16 and 17 respectively. These shoes are of the conventional transverse T cross section provided with lining on the periphery of the head of the T section. They are adapted to coact through the lining with the brake drum 18 (Figure 5) carried by the wheel or other revolving part and revolved in respect to the fixed support 10. (See Figs. 2 and 5.) The particular form of the brake drum support 10 and the brake drum 18 have no particular moment in connection with this invention nor do the particular forms of cross section of the bodies of the brake shoe. My invention has to do with the mounting of these shoes and the mechanism for applying the mounting of these shoes, their adjustment and the mechanism for applying loads thereto. Intermediate the adjacent ends 16 and 17 are provided load applying means in the form of cam levers 19. These levers are floatingly mounted for circumferential flotation about anchor and centering pins 20 by means of an elongated slot 21 through which the pins 20 project, whereby the cam ends may partake of a limited annular movement backwardly or forwardly with respect to the pins 20. The cams 22 of these levers are bipartite comprised of one part lying on each side of the pins 20 and extending with the levers 19 in general substantially radially of the mechanism. The cams 22 coact with cam surfaces 23 also of bipartite form (divided in two in the regions of the pins 20) connected with the ends 16—17 of the shoes. Thus when the power is applied to any lever 19 as indicated in Fig. 4, one part of cam 22 coacts with one cam surface 23 to constitute a fulcrum for the lever 19 while the mating part 22 coacts with the mating part 23 of an adjacent shoe end to apply the load to the shoe. Thus direction of rotation of the brake drum being assumed in the direction of the arrow about the periphery of Fig. 1 and the load being assumed to be applied to shoe end 16, the same application of equal forces to each of the cam levers 19, assuming these to be of equal length, will result in the application of unequal loads to the two shoes. This is for the reason that in the instance of the left hand cam lever 19 illustrated, the fulcrum consists of those portions of cam 22, and cam surfaces 23 lying radially innermost and the load application is made through those parts 22—23 lying radially outermost, while in the instance of the like device on the right-hand side the fulcrum consists of the outermost parts 22—23 and the load is applied through the radially innermost parts 22—23. An identical length of lever 19 can but result in the application of unequal loads to the ends of the respective shoes.

Connected with the levers 19, however, is a power applying yoke 24 the opposite ends 25 and 26 of which are respectively connected with the left hand and the right hand levers 19 by identical links 27. These links are connected with the levers through apertured ends which are slipped over the ends of the levers 19 and into notches 28 a multiple number of which notches are provided in connection with each lever whereby the links may be adjusted to either one which may be desired. The link 27 on the left is connected with the outer notch 28 while the link 27 on the right is connected with the inner notch 28 whereby there is provided in connection with the application of power to the left hand lever 19 a greater mechanical advantage than in connection with the application of power to the right hand lever 19. Further the length of the arm 26 of the yoke 24 is made greater than the length of the arm 25, distances being measured from the intermediate connection 29 through which braking power is applied to the yoke. This still further lessens the mechanical advantage of the lever part of the right hand cam lever 19. Through these two expedients, the lengthening of the left hand lever 19 coincidentally with the shortening of the right hand lever and the lengthening of the right hand arm 26 as compared with the left hand arm 25 of the yoke, the developments of the loads applied to the brakes through the cams 22 and cam surfaces 23 are effectually equalized.

Anchor pins 20 while floating the cam levers 19 through the annularly elongated but radially close fitting slots 21, are of themselves as anchor pins radially adjustable through the provision of radially extending slots 29' in the fixed supports 10 through which the shanks 30 are projected for adjustable securement by adjusting nuts 31. Through this means the pins are adjusted radially inwardly or outwardly with considerable nicety carrying the cams 19 with them. They also carry with them at least one of the adjacent ends 16—17 of the shoes, preferably the end 17, for these ends of the shoes are recessed intermediate the cam surfaces 23 as is clearly shown in Figs. 1 and 4 to embrace the pins 20. The recessing of the ends 17 is precisely complemental to the circular cross section of the pins 20, but the recessing of the ends 16 is on equal arcs of the same radius, struck from eccentric centers as clearly appears in Fig. 4. Thus with forward rotation of a vehicle wheel in the direction of the arrow in Fig. 1, the ends 17 which in such case constitute the heels of the shoe are properly radially adjusted for wheel adjustments since the ends 17 fit snugly and follow truly the radial movements of the pins 20. This they could not readily do were it not for the fact that the ends 16 have longer recesses. These recesses in general are designated 32. Furthermore, when the brake is operated it is the toe end 16 that needs to freely leave the pin and promptly and fully engage the shoe with the brake drum. This it can do the more promptly and fully when recessed at 32 on an arc of somewhat different contour than that of the pin. At the same time this extension of the recess 32 in connection with the toe end 16 of the shoes is not so great but what when the brake is operated in reverse, what is normally the toe of the shoe can promptly and fully take up position in contact with the pins 20 as the heel of the shoe. Nor yet, must the diameter of the pin 20 and its close fitting recess 32 connecting with the heel 17, be such that on reverse action here is undue delay or drag of movement of the heel 17 of the brake which must now become the toe.

It is the toe ends 16 of the brake which are provided with the tangential adjusting means. This is in the form of a threaded shank 32', see Figs. 1, 4 and 5, the end of which carries the cam surfaces 23. This shank 32' has its sides flatted as at 33 and its main body is fitted longitudinally into a slot 34 in the body 15 of the shoe and confined therein by opposed side plates 35 welded to the body of the shoe. The fit is a sliding fit. The flats prevent shank 32' from turning. Threaded on the shank is a ratchet nut 36 the teeth on the periphery of which provide means for its turning in such a manner that that face 37 which is contiguous to the end of the shoe 15 reacts against it and a shank 32' is adjusted in or out as the case may be. Face 37 is radially notched as at 38 (see Fig. 3) and these notches coact each with the edges of the contiguous body 15, the edges 39 entering the slots 38 to retain the nut against rotation in its adjusted position. Access to the ratchet nuts 36 for adjustment is had by projecting the point of a screw driver through the openings 40 in the supporting plate 10.

The entire assemblage of shoes 15, ratchet adjusting nuts, 36, anchor pins 20, cam levers 19, are retained in their normal idle positions as shown in Fig. 1 by one and the same pair of retracting springs 41 which draw together and into contact with the anchor pins 20 and the cams 22 the ends 16 and 17 of the brake shoes.

The supporting plates 10 are rendered usable either right or left by the duplication of apertures 40 and other apertures as may be necessary on opposite sides of its axial plane of symmetry passing approximately through the axis of the anchor pin 20. The shoes 15 are identical and interchangeable, especially since they connect with identical opposite ends of the yoke 24 through notched connections 42 essentially similar to the notched connections 28 with the levers 19. They are retained in connection through spreading bow springs 53 the opposite ends of which are entered into the slotted ends of the links 27 and engage with the bottoms of the notches 28 thereby bearing directly upon levers 19 and yoke 24 respectively and spreading them apart placing links 27 normally under slight tension. These springs are identical. The cam surfaces 23 of the heels are identical. Likewise the cam surfaces 23 carried by the adjustable shanks 32' of the toe ends 16 are identical with each other as are also their mountings and their adjusting ends. The yokes 24 are the same for all brakes right or left, front and rear. Thus there is realized a minimum die cost for parts and a maximum saving of time and assembly and adjustment. Most of the parts may be die forgings or die castings. They are straight-forward, simple and light and yet possess strength, reliability, durability and ruggedness. A saving in weight of from fifteen to twenty per cent over the usual braking mechanism is effected.

An augmentation of power over and above the usual two shoe brake, provided with but one load applying device acting in unbalanced manner, upon the forward and reverse shoes is very great. Action is perfectly symmetrical in the forward movement of the brake illustrated by the arrow at the periphery of Fig. 1, this by reason of the means employed to equalize unbalanced loading. On reverse movement, the opposite of that illustrated in Fig. 1, the action will not be symmetrical for the reason that the other means utilized in the form of the increased mechanical advantage and power applied to the left hand mechanism as shown in Fig. 1 serves to apply a greater toe force to the lower shoe 15 than is applied to the upper shoe 15. Nevertheless, there is obtained a reverse braking action very greatly augmented over and above the reverse braking action of the ordinary two shoe brakes for both shoes are acting independently, each has application of load to its toe in the proper direction and each responds so fully as the load applied warrants. Reverse action taking place for so small a fraction of the total operating time any dissymmetry existing during this period is immaterial compared with the immense advantage obtained through the greatly augmented braking action at large. The symmetry of braking application during all forward movement insures a symmetry of drum distortion and in the net a decreased degree of drum distortion. This symmetry of action coupled with the symmetry of adjustment and the independent adjustment of heel and toe, the latter bringing about always a more general and a more perfect fit of the shoes to the drum and a more uniform clearance, gives a uniform distribution, of that quality of wear which the symmetry establishes between the two equally loaded shoes. A greatly increased life of drum lining and a greatly increased life of brake drum results.

My invention is susceptible of many modifications. In the drawings I show different variations of power applying means, the one shown in Figs. 1 to 7 consists of a bell crank lever 52 the main body of which 43 is journaled in a bearing 44 applied at an angle to the main body of the supporting plate 10. Its inner or shorter arm 45 engages through a ball joint 46 with the power connection 29 of the yoke 24. Its outer or longer arm 47 connects with the drag link or cable. This is the operating device for rear wheel brakes.

Another variation (Figures 8 and 9) shows an operating device of the brake type for application to front wheels. In this case the operating connection 29 of the yoke makes a ball joint connection 46 with the lower end 48 of the substantially vertically extending reciprocable plunger rod 49 which passes substantially vertically through the angularly inclined joint 50 of the front wheels with the front axle 51. This rod 49 is reciprocated vertically by the braking mechanism bearing vertically down upon the yoke 24 through the ball joint connection 46.

By way of further variation, the arrangement of the parts illustrated in Figure 10 is particularly applicable under certain conditions of use. The total braking surface is sufficiently effective although peripheral extent of the same may be more limited. Springs 41 retaining the brake shoes in inactive position are radially outwardly of the pivot points 20. To provide a yoke in suitable form for this variation, the ends 25 and 26 of the yoke are provided with slotted portions 53 arranged to engage the notches 28 of the levers 19. The toe and heel connection for the shoes with the pivot points 20 is of slightly different construction conforming to the arrangement of the other parts, the ends 17 being arranged in such a manner as to give efficient braking and to avoid any tendency toward locking of the shoes.

What I claim is:

1. A symmetrical two shoe brake comprising cam levers between adjacent ends of the shoes, the cams of which, upon engagement of the shoes with and movement by the drum, develop, respectively, different mechanical advantages for levers of the same length for the same applied power, and the power arms of which have their lengths adjusted in accordance with the differential mechanical advantages to apply equalized loads to the brake shoes from each cam.

2. A symmetrical two shoe brake comprising cam levers between adjacent ends of the shoes, the cams of which, upon engagement of the shoes with and movement by the drum, develop, respectively, different mechanical advantages for levers of the same length for the same applied power, and the power arms of which have their lengths adjusted in accordance with the differential mechanical advantages to apply equalized loads to the brake shoes from each cam, and common power applying means also engaging in the equalizing action and consisting of a yoke, the opposite ends of which are associated, respectively, with the respective cam levers, said yoke being provided dis-symmetrically at an intermediate point with a brake applying connection.

3. A brake comprising a pair of brake shoes and substantially tangentially floating load applying means between each pair of adjacent ends of said shoes, and anchor means for the shoes upon which anchor means the load applying means float, the anchor means providing a centering action with the adjacent ends of the shoes when the brake is off and being adjustable in radial direction.

4. A brake comprising a pair of brake shoes and substantially tangentially floating load applying means between each pair of adjacent ends of said shoes, anchor means for the shoes upon which anchor means the load applying means float, the anchor means being alternatively engaged by the adjacent ends of the shoes in accordance with the direction of operation of the brake, one end of each shoe being tangentially adjustable in elongation of the main body thereof, and adjusting means comprising a threaded shank having one end thereof engaging the anchor pin and longitudinally extending the end of the shoe, a ratchet device associated with said shank and a fixed abutment on the shoe proper and having adjustable recessed engagement with said fixed abutment.

5. A symmetrical two shoe brake comprising cam levers between adjacent ends of the shoes, the cams of which, upon engagement of the shoes with and movement by the drum, develop, respectively, different mechanical advantages for levers of the same length for the same applied power, and the power arms of which have their lengths adjusted in accordance with the differential mechanical advantages to apply equalized loads to the brake shoes from each cam, the power arms of the levers being notched, and a power applying yoke the ends of which are, respectively, linked to different notches.

6. A brake according to claim 5, in which the links slip freely over the ends of the levers into the notches, and spring means spreading the levers and yoke apart whereby to maintain the links within the notches.

CAROLUS L. EKSERGIAN.